United States Patent
Raj et al.

(10) Patent No.: US 7,636,832 B2
(45) Date of Patent: Dec. 22, 2009

(54) I/O TRANSLATION LOOKASIDE BUFFER PERFORMANCE

(75) Inventors: Ashok Raj, Portland, OR (US); Rajesh Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 11/588,900

(22) Filed: Oct. 26, 2006

(65) Prior Publication Data

US 2008/0104363 A1    May 1, 2008

(51) Int. Cl.
*G06F 12/10* (2006.01)
(52) U.S. Cl. .................................. 711/207
(58) Field of Classification Search .............. None
See application file for complete search history.

(56) References Cited

U.S. PATENT DOCUMENTS

| | | | |
|---|---|---|---|
| 4,965,719 A | 10/1990 | Shoens et al. |
| 5,029,072 A | 7/1991 | Moyer et al. |
| 5,050,072 A | 9/1991 | Earnshaw et al. |
| 5,163,143 A | 11/1992 | Culley et al. |
| 5,226,143 A | 7/1993 | Baird et al. |
| 5,230,070 A | 7/1993 | Liu |
| 5,566,319 A | 10/1996 | Lenz |
| 6,378,048 B1 | 4/2002 | Prudvi et al. |
| 6,549,989 B1 | 4/2003 | Arimilli et al. |
| 7,082,508 B2 | 7/2006 | Khan et al. |
| 2004/0221128 A1 | 11/2004 | Beecroft et al. |
| 2004/0268071 A1 | 12/2004 | Khan et al. |
| 2007/0150658 A1 | 6/2007 | Moses et al. |
| 2008/0005512 A1 | 1/2008 | Narayanasamy et al. |

OTHER PUBLICATIONS

Graunke, G. et al., "Synchronization algorithms for shared-memory multiprocessors", *IEEE* vol. 23, No. 6, (Jun. 1990), pp. 60-69.
Johnson, T et al., "A prioritized multiprocessor spin lock", *IEEE Transactions on Parallel and Distributed Systems*, vol. 8, Issue 9, (Sep. 1997), pp. 926-933.
Anderson, T. E., "The performance of spin lock alternatives for shared-memory multiprocessors", *IEEE Transactions on Parallel and Distributed Systems*, vol. 1, Issue 1, (Jan. 1990), pp. 6-16.
U.S. Appl. No. 11/319,897, filed Dec. 28, 2005, Illikkal, Ramesh G., et al.
U.S. Appl. No. 11/478,423, filed Jun. 29, 2006, Narayanasamy, Raja et al.
Narayanasamy, Raja et al., "Improving Network Performance in Virtualized Environments", U.S. Appl. No. 11/478,423, filed Jun. 29, 2006.
Spracklen, L. et al. "Chip multithreading: opportunities and challenges", *High Performance Computer Architecture*. HPCA-11 2005, 11th International Symposium on High-Performance Computer Architecture, (Feb. 2005), pp. 12-16.
Office Action received for U.S. Appl. No. 11/478,423, mailed on Jul. 16, 2009, 14 pages.

*Primary Examiner*—Jack A Lane
(74) *Attorney, Agent, or Firm*—Caven & Aghevli LLC

(57) ABSTRACT

Methods and apparatus to provide improved input/output (I/O) address translation lookaside buffer performance are described. In one embodiment, one or more entries of a cache (e.g., an I/O address translation lookaside buffer) are locked in response to a request to lock the one or more entries. Other embodiments are also described.

28 Claims, 5 Drawing Sheets

I/O TRANSLATION LOOKASIDE BUFFER PERFORMANCE

BACKGROUND

The present disclosure generally relates to the field of electronics. More particularly, an embodiment of the invention relates to a locking technique that improves translation lookaside buffer (TLB) performance for input/out (I/O) memory address translations.

Computer networks have become an integral part of computing. To improve networking bandwidth, some systems may utilize virtualization. For example, virtual memory addressing may allow for access to a relatively larger amount of storage. However, virtualized environments may limit full utilization of advances in networking bandwidth, e.g., due to overhead associated with translating between I/O virtual and host memory physical addresses.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments of the invention may be practiced without the specific details. In other instances, well-known methods, procedures, components, and circuits have not been described in detail so as not to obscure the particular embodiments of the invention. Further, various aspects of embodiments of the invention may be performed using various mechanisms, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may provide efficient mechanisms for improving performance in environment that utilize I/O virtualization, e.g., by reducing address translation latency. In an embodiment, one or more entries in a cache (such as an I/O translation lookaside buffer (TLB)) used for translating between physical and virtual addresses may be locked. Locking of entries may reduce the occurrence of misses in the cache which in turn may improve the performance for subsequent access to the cached address translation data. In one embodiment, the decision of whether a select entry of an I/O TLB is to be locked may be made based on whether that entry is expected to be used in the future. For example, software (such as a device driver, operating system, a software application, and/or virtual machine monitor module) may determine that certain types of data (e.g., isochronous) or certain usage models (e.g., where the same data buffer may be reused repeatedly in case of large data transfers) may cause access to the same entry cached in an I/O TLB and, as a result, the corresponding entry is to be locked for better performance.

Figure 1:
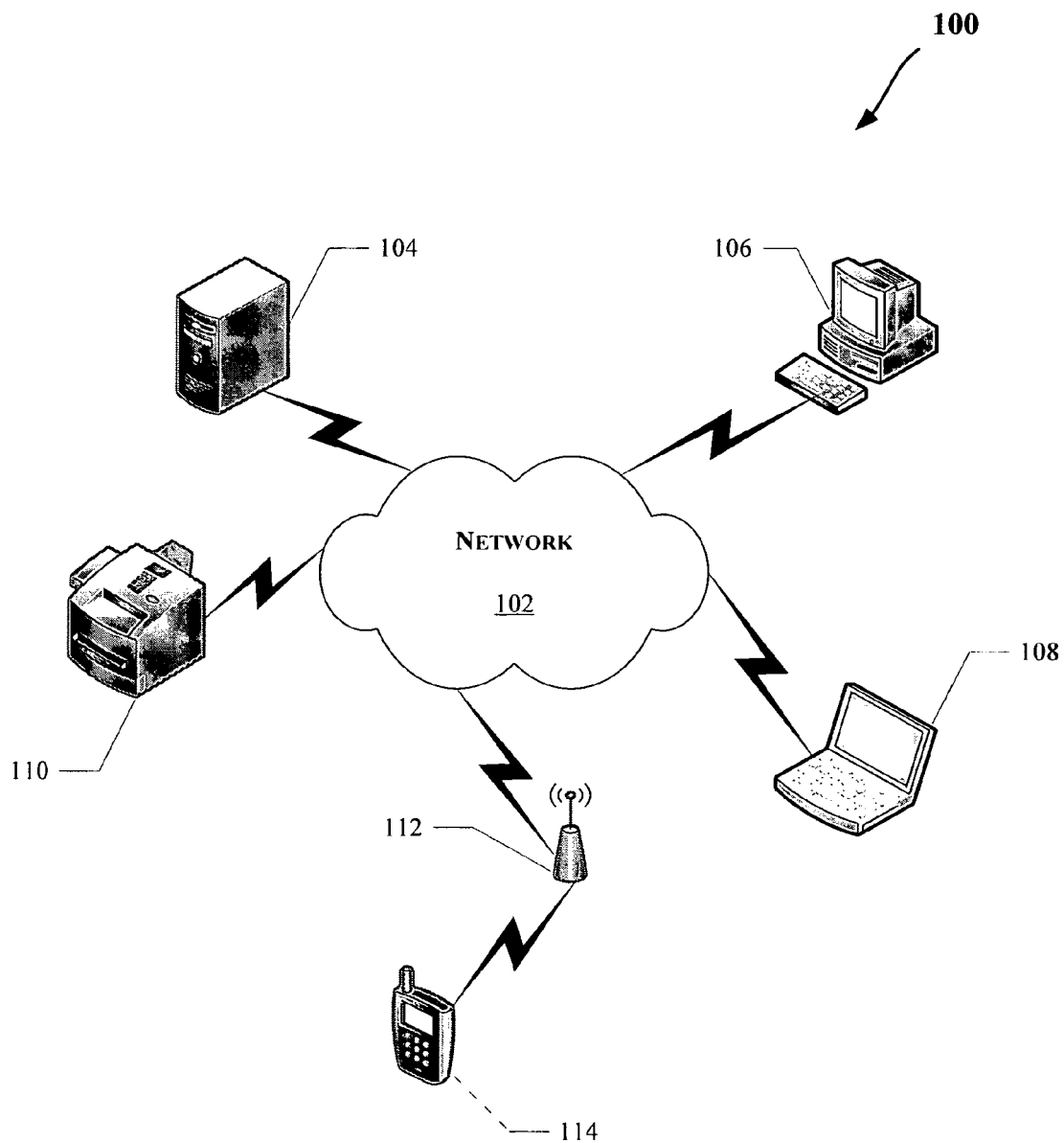
FIG. 1 illustrates various components of an embodiment of a networking environment, which may be utilized to implement various embodiments discussed herein.

Furthermore, some of the embodiments discussed herein may be applied in various environments, such as the networking environment discussed with reference to FIG. 1 and/or the computing systems discussed with reference to FIGS. 2 and 5. More particularly, FIG. 1 illustrates various components of an embodiment of a networking environment 100, which may be utilized to implement various embodiments discussed herein. The environment 100 may include a network 102 to enable communication between various devices such as a server computer 104, a desktop computer 106 (e.g., a workstation or a desktop computer), a laptop (or notebook) computer 108, a reproduction device 110 (e.g., a network printer, copier, facsimile, scanner, all-in-one device, etc.), a wireless access point 112, a personal digital assistant or smart phone 114, a rack-mounted computing system (not shown), etc. The network 102 may be any type of type of a computer network including an intranet, the Internet, and/or combinations thereof.

The devices 104-114 may communicate with the network 102 through wired and/or wireless connections. Hence, the network 102 may be a wired and/or wireless network. For example, as illustrated in FIG. 1, the wireless access point 112 may be coupled to the network 102 to enable other wireless-capable devices (such as the device 114) to communicate with the network 102. In one embodiment, the wireless access point 112 may include traffic management capabilities. Also, data communicated between the devices 104-114 may be encrypted (or cryptographically secured), e.g., to limit unauthorized access.

The network 102 may utilize any communication protocol such as Ethernet, Fast Ethernet, Gigabit Ethernet, wide-area network (WAN), fiber distributed data interface (FDDI), Token Ring, leased line, analog modem, digital subscriber line (DSL and its varieties such as high bit-rate DSL (HDSL), integrated services digital network DSL (IDSL), etc.), asynchronous transfer mode (ATM), cable modem, and/or FireWire.

Wireless communication through the network 102 may be in accordance with one or more of the following: wireless local area network (WLAN), wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), etc. Moreover, network communication may be established by internal network interface devices (e.g., present within the same physical enclosure as a computing system) such as a network interface card (NIC) or external network interface devices (e.g., having a separate physical enclosure and/or power supply than the computing system to which it is coupled).

Figure 2:
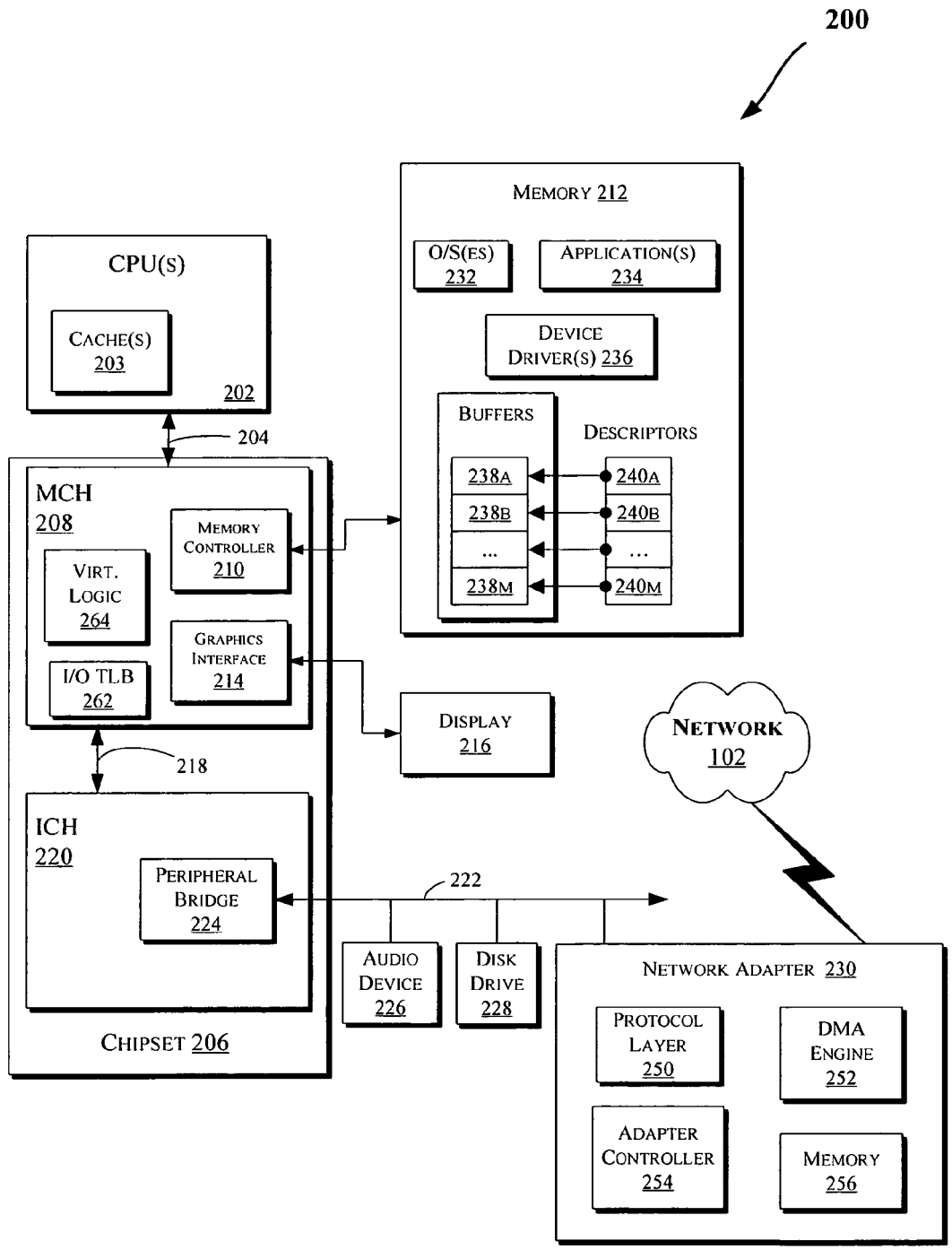
FIGS. 2 and 5 illustrate block diagrams of embodiments of computing systems, which may be utilized to implement various embodiments discussed herein.

FIG. 2 illustrates a block diagram of an embodiment of a computing system 200. One or more of the devices 104-114 discussed with reference to FIG. 1 may comprise one or more components of the computing system 200. The computing system 200 may include one or more central processing unit(s) (CPUs) 202 (which may be collectively referred to herein as "processors 202" or more generically "processor 202") coupled to an interconnection network (or bus) 204. The processors 202 may be any type of processor such as a general purpose processor, a network processor (which may process data communicated over a computer network (102)), etc. (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die. Also, the processors 202 with a multiple core design may be implemented as symmetrical or asymmetrical multiprocessors.

The processor 202 may include one or more caches (203), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache 203 may be any type of cache, such a level 1 (L1) cache, a level 2 (L2) cache, a level 3 (L-3), a mid-level cache, a last level cache (LLC), etc. to store electronic data (e.g., including instructions) that is utilized by one or more components of the system 200.

A chipset 206 may additionally be coupled to the interconnection network 204. The chipset 206 may include a memory control hub (MCH) 208. The MCH 208 may include a memory controller 210 that is coupled to a memory 212. The memory 212 may store data, e.g., including sequences of instructions that are executed by the processor 202, or any other device in communication with components of the computing system 200. In one embodiment of the invention, the memory 212 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 204, such as multiple processors and/or multiple system memories.

The MCH 208 may further include a graphics interface 214 coupled to a display device 216 (e.g., via a graphics accelerator in an embodiment). In one embodiment, the graphics interface 214 may be coupled to the display device 216 via an accelerated graphics port (AGP). In an embodiment of the invention, the display device 216 (such as a flat panel display) may be coupled to the graphics interface 214 through, for example, a signal converter that translates a digital representation of an image stored in a storage device such as video memory or system memory (e.g., memory 212) into display signals that are interpreted and displayed by the display 216.

As shown in FIG. 2, a hub interface 218 may couple the MCH 208 to an input/output control hub (ICH) 220. The ICH 220 may provide an interface to input/output (I/O) devices coupled to the computing system 200. The ICH 220 may be coupled to a bus 222 through a peripheral bridge (or controller) 224, such as a peripheral component interconnect (PCI) bridge, a universal serial bus (USB) controller, etc. The bridge 224 may provide a data path between the processor 202 and peripheral devices. Other types of topologies may be utilized. Also, multiple buses may be coupled to the ICH 220, e.g., through multiple bridges or controllers. For example, the bus 222 may comply with the PCI Local Bus Specification, Revision 3.0, Mar. 9, 2004, available from the PCI Special Interest Group, Portland, Oreg., U.S.A. (hereinafter referred to as a "PCI bus"). Alternatively, the bus 222 may comprise a bus that complies with the PCI-X Specification Rev. 2.0a, Apr. 23, 2003, (hereinafter referred to as a "PCI-X bus") and/or PCI Express (PCIe) Specifications (PCIe Specification, Revision 1.0a, June 2005), available from the aforesaid PCI Special Interest Group, Portland, Oreg., U.S.A. Further, the bus 222 may comprise other types and configurations of bus systems. Moreover, other peripherals coupled to the ICH 220 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 222 may be coupled to an audio device 226, one or more disk drive(s) 228, and a network adapter 230 (which may be a NIC in an embodiment). Other devices may be coupled to the bus 222. Also, various components (such as the network adapter 230) may be coupled to the MCH 208 in some embodiments of the invention. In addition, the processor 202 and the MCH 208 may be combined to form a single chip.

Additionally, the computing system 200 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 228), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 212 may include one or more of the following in an embodiment: an operating system (O/S) 232, application 234, device driver 236, buffers 238, and/or descriptors 240. For example, a virtual machine (VM) configuration (e.g., implemented through on a virtual machine monitor (VMM) module) may allow the system 200 to operate as multiple computing systems, e.g., each running a separate set of operating systems (232), applications (234), device driver(s) (236), etc. Programs and/or data stored in the memory 212 may be swapped into the disk drive 228 as part of memory management operations. The application(s) 234 may execute (e.g., on the processor(s) 202) to communicate one or more packets with one or more computing devices coupled to the network 102 (such as the devices 104-114 of FIG. 1). In an embodiment, a packet may be a sequence of one or more symbols and/or values that may be encoded by one or more electrical signals transmitted from at least one sender to at least on receiver (e.g., over a network such as the network 102). For example, each packet may have a header that includes various information which may be utilized in routing and/or processing the packet, such as a source address, a destination address, packet type, etc. Each packet may also have a payload that includes the raw data (or content) the packet is transferring between various computing devices (e.g., the devices 104-114 of FIG. 1) over a computer network (such as the network 102).

In an embodiment, the application 234 may utilize the O/S 232 to communicate with various components of the system 200, e.g., through the device driver 236. Hence, the device driver 236 may include network adapter (230) specific commands to provide a communication interface between the O/S 232 and the network adapter 230, or other I/O devices coupled to the system 200, e.g., via the chipset 206. In an embodiment, the device driver 236 may allocate one or more buffers (238A through 238M) to store I/O data, such as the packet payload. One or more descriptors (240A through 240M) may respectively point to the buffers 238. In an embodiment, one or more of the buffers 238 may be implemented as circular ring buffers. Also, one or more of the buffers 238 may correspond to contiguous memory pages in an embodiment.

In an embodiment, the O/S 232 may include a network protocol stack. A protocol stack generally refers to a set of procedures or programs that may be executed to process packets sent over a network (102), where the packets may conform to a specified protocol. For example, TCP/IP (Transport Control Protocol/Internet Protocol) packets may be processed using a TCP/IP stack. The device driver 236 may indicate the buffers 238 that are to be processed, e.g., via the protocol stack.

As illustrated in FIG. 2, the network adapter 230 may include a (network) protocol layer 250 for implementing the physical communication layer to send and receive network packets to and from remote devices over the network 102. The network 102 may include any type of computer network such as those discussed with reference to FIG. 1. The network adapter 230 may further include a direct memory access (DMA) engine 252, which writes packets to buffers (238) assigned to available descriptors (240) to transmit and/or receive data over the network 102. Additionally, the network adapter 230 may include a network adapter controller 254, which may include logic (such as one or more programmable processors) to perform adapter related operations. In an embodiment, the adapter controller 254 may be a MAC (media access control) component. The network adapter 230 may further include a memory 256, such as any type of volatile/nonvolatile memory (e.g., including one or more cache(s) and/or other memory types discussed with reference to memory 212).

In one embodiment, the chipset 206 (e.g., within the MCH 208 in an embodiment) an I/O TLB 262 that stores address translation information corresponding to one or more memory access requests (e.g., including read or write accesses to the memory 212). The TLB 262 may be a content addressable memory (CAM) or other types of cache (or memory discussed with reference to memory 212). In an embodiment, a locked entry of the TLB 262 may be evicted after unlocked entries in the TLB 262 are evicted. Further details regarding when locked entries of the TLB 262 may be evicted are discussed with reference to FIG. 4.

In one embodiment, a memory access request (e.g., such as a DMA request generated by the DMA engine 252 or other devices coupled to the system 200, for example, via the chipset 206) may be sent to a virtualization logic 264. The logic 264 may determine whether the TLB 262 includes an entry that corresponds to the received request. Hence, the logic 264 may be in communication with the TLB 262. If a corresponding entry does not exist in the TLB 262, the logic 264 may cause the creation of the entry and possibly lock it (e.g., in accordance with a signal that indicates the entry is to be locked). Logic 264 may be provided in other locations than that shown in FIG. 2. For example, logic 264 may be provided elsewhere in the chipset 206, e.g., within ICH 220. Also, logic 264 may be located elsewhere outside the chipset 206, e.g., provided within the network adapter 230.

Figure 3:
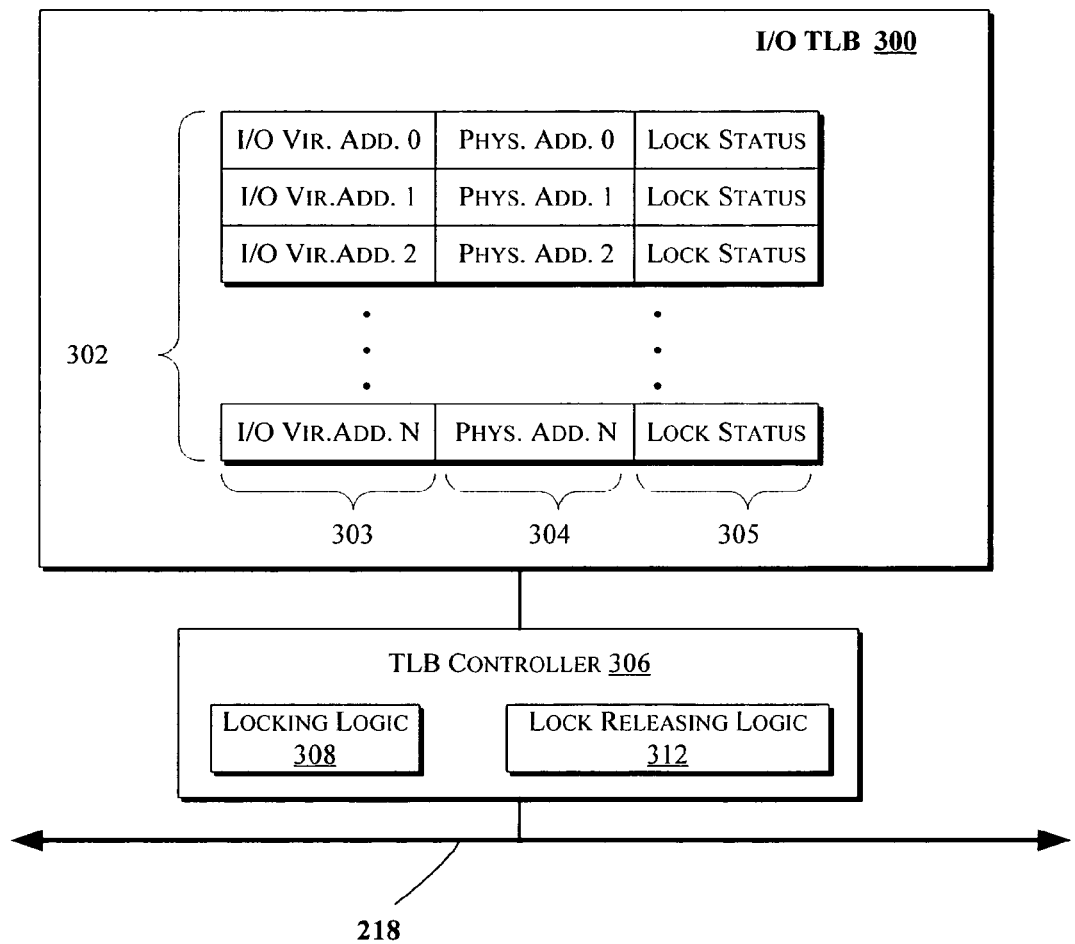
FIG. 3 illustrates a block diagram of portions of an input/output translation lookaside buffer, according to an embodiment

FIG. 3 illustrates a block diagram of portions of an input/output translation lookaside buffer (TLB) 300, according to an embodiment. In an embodiment, the TLB 300 may be the similar to or the same as the TLB 262 of FIG. 2. As shown in FIG. 3, the TLB 300 may include one or more entries 302. Each entry of the TLB 300 may have an I/O virtual memory address field 303 (e.g., that stores the I/O virtual memory address corresponding to a select entry 302), a physical memory address field 304 (e.g., that stores a physical memory address that corresponds to the virtual memory address of that TLB entry), and a lock status field 305 (e.g., that may be utilized to indicate whether the corresponding TLB entry is locked).

In an embodiment, the TLB 300 may communicate with other components of the system 200 of FIG. 2 via a TLB controller 306. The TLB controller 306 may communicate with other components of the system 200 of FIG. 2, e.g., the adapter 230 via the hub interface 218 or the virtualization logic 264. The controller 306 may include logic for various operations performed on the TLB 300. For example, the controller 306 may include a locking logic 308 (for example, to lock one or more of the entries 302 via updating a value stored in the corresponding fields 305, e.g., based on a signal caused to be generated by the driver(s) 236, the O/S 232, and/or application 234) and/or a lock releasing logic 312 (e.g., to unlock one or more of the entries 302 by updating a value stored in the corresponding fields 305 as will be further discussed with reference to FIG. 4). Moreover, in an embodiment, the fields 305 may include a single bit and a set bit may indicate locking and a clear bit may indicate no locking. However, alternatively, a set bit may indicate no locking and a clear bit may indicate locking. Hence, the logics 308 and 312 may set or clear bits (305) depending on implementation. Also, one or more of the logics 308 and/or 312 may be provided elsewhere in the system 200 of FIG. 2 (e.g., within the logic 264). Furthermore, the lock status field 305 may be implemented in a reserved portion of the entries 302 in an embodiment.

In an embodiment, the lock releasing logic 312 may unlock (or remove an existing lock for) one or more of entries 302 based on various criteria. For example, the lock releasing logic 312 may unlock (or remove an existing lock for) one or more entries 302 based on: (1) a signal generated by the logic 264 to indicate that one or more specific TLB 300 entries are to be unlocked, (for example, based on available space in the TLB 300, e.g., when compared with a threshold level which may be configured via software or firmware by a user); (2) a cache replacement policy; and/or (3) at the direction of the device driver 236, application 234, and/or O/S 232.

In an embodiment, the locking logic 308 may create a lock for one or more of entries 302 based on various criteria. For example, the locking logic 308 may create a lock for one or more entries 302: (1) at the direction of the device driver 236, application 234, and/or O/S 232 or (2) in response to a signal generated by the logic 264, e.g., to indicate that one or more specific TLB 300 entries are to be locked, (for example, based on frequency of prior usage of the TLB entry 300). In an embodiment, the locking logic 308 may create or lock one or more of entries 302 dynamically on demand when an I/O DMA request occurs and there is no corresponding entry in the TLB 300 for the DMA I/O virtual address.

Figure 4:
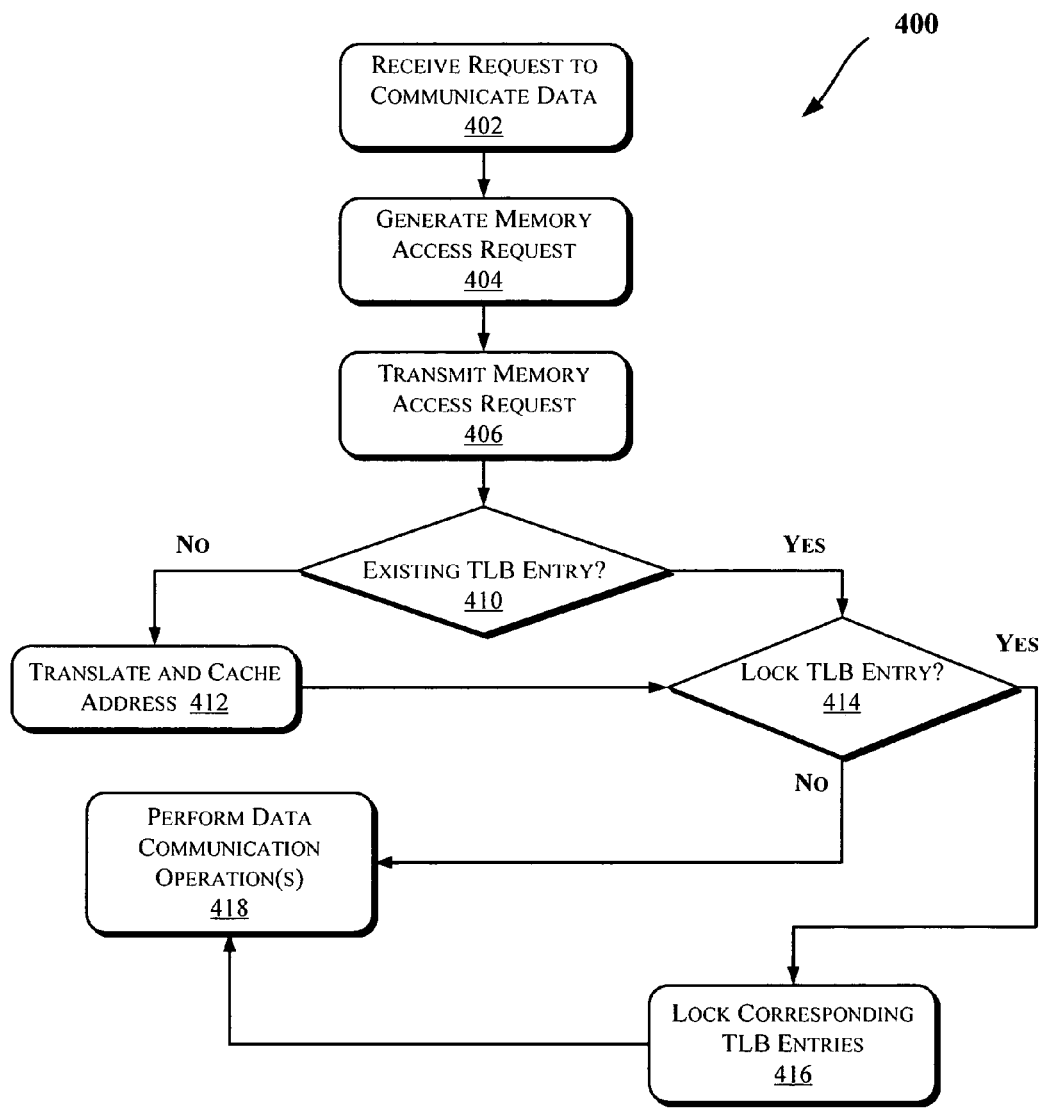
FIG. 4 illustrates a flow diagram of a method to cause locking of one or more entries in a translation lookaside buffer, according to an embodiment.

FIG. 4 illustrates a flow diagram of a method 400 to cause locking of one or more entries in a translation lookaside buffer, according to an embodiment. In an embodiment, various components discussed with reference to FIGS. 1-3 may be utilized to perform one or more of the operations discussed with reference to FIG. 4.

Referring to FIGS. 1-4, at an operation 402, a component of the system 200 (e.g., the network adapter 230) may receive a request to communicate data (e.g., via the network 102). At an operation 404, a memory access request (such as a DMA request) may be generated by one of the (e.g., by the network adapter 230 or one of its components such as the DMA engine 252) to copy data to or from the memory 212. The generated memory access may be then transmitted (e.g., by the network adapter 230) to the MCH 208 for access to the memory 212 at an operation 406.

At an operation 410, the TLB 262 may be accessed (e.g., via the logic 264 and/or the controller 306) to determine whether an entry corresponding to the transmitted memory access request exists in the TLB 262. For example, the transmitted memory access request (406) may refer to an I/O virtual memory address and the logic 264 may cause translation of the virtual address into a corresponding host physical address that corresponds to a portion of the memory 212 (such as a memory page). Moreover, at an operation 412, if a corresponding entry is not present in the TLB 262, the logic 264 may cause access a page table (not shown), e.g., that may be stored in a storage unit discussed with reference to FIG. 2 such as the disk drive 228, to translate the virtual memory address of the memory access request into a physical memory address. At operation 412, an entry within the TLB 262 may be allocated to the address translation information for the memory access request (such as the data discussed with reference to the TLB 300) such that future accesses to the same virtual address may be translated more quickly.

At an operation 414, it may be determined whether the entry in the TLB 262 that corresponds to the memory access request of operation 404 is to be locked. As discussed herein, the operation 414 may be performed in accordance with a signal that is caused to be generated by the driver(s) 236, the O/S 232, and/or application 234. In one embodiment, the decision of whether a select entry of a TLB (e.g., an entry of the TLB 262) is to be locked at operation 414 may be made based on whether that entry is expected to be used in the future. For example, software (such as the device driver 236, operating system 232, application 234, and/or a virtual machine monitor (VMM) module) may determine that certain types of data (e.g., isochronous) or certain usage models (e.g., where the same data buffer may be reused repeatedly in case of large data transfers) may cause access to the same entry cached in the TLB and, as a result, the corresponding entry is to be locked for better performance. If the entry is to be locked, operation 416 locks the corresponding entry (e.g., the locking logic 308 updates the value stored in the corresponding lock status field 305 as discussed with reference to FIG. 3). In an embodiment, the logic 308 may lock all TLB entries that correspond to addresses accessed by a given device (e.g., as long as the TLB 262 has available space for the new entries, or alternatively other TLB entries may be evicted to provide space for the new entries). In an embodiment, a locked entry of the TLB 262 may be evicted after unlocked entries in the TLB 262 are evicted.

In some embodiments, a locked entry of the TLB 262 may be evicted (e.g., by the TLB controller 306) based on one or more of the following:

a. when software (such as the device driver 236, operating system 232, application 234, and/or a virtual machine monitor (VMM) module) explicitly flushes a locked entry of the TLB 262, that entry may be removed from the TLB 262;

b. when software (such as the device driver 236, operating system 232, application 234, and/or a virtual machine monitor (VMM) module) flushes multiple entries of the TLB 262 using a "normal" TLB flush command, the locked TLB entry may not be removed; examples of such invalidate events may include domain specific TLB invalidates (which flushes all TLB entries except locked TLB entries for I/O devices that belong to the same protection domain) and/or global TLB invalidates (where all TLB entries except locked TLB entries across all I/O device domains are invalidated);

c. when the virtualization logic 264 and/or the TLB controller 306 may attempt to provide additional storage for a new address translation entry in the TLB 262 (e.g. based on some least recently used (LRU) policy), it evicts a locked TLB entry only as a last resort; hence, a locked TLB entry may be evicted in this case when another unlocked TLB entry can not be found to evict; and/or d. the virtualization logic 264 and/or the TLB controller 306 may support some commands to flush multiple TLB entries including locked TLB entries; examples of such invalidate commands may include domain specific TLB invalidates (which flushes all TLB entries including locked TLB entries for I/O devices that belong to the same protection domain) and/or global TLB invalidates (where all TLB entries including locked TLB entries across all I/O device domains are invalidated).

After locking the corresponding entry at operation 416 or determining that the entry is not to be locked at operation 414, at an operation 418, data communication operations may be performed to communicate data as requested at operation 402, e.g., via the network 102.

Figure 5:
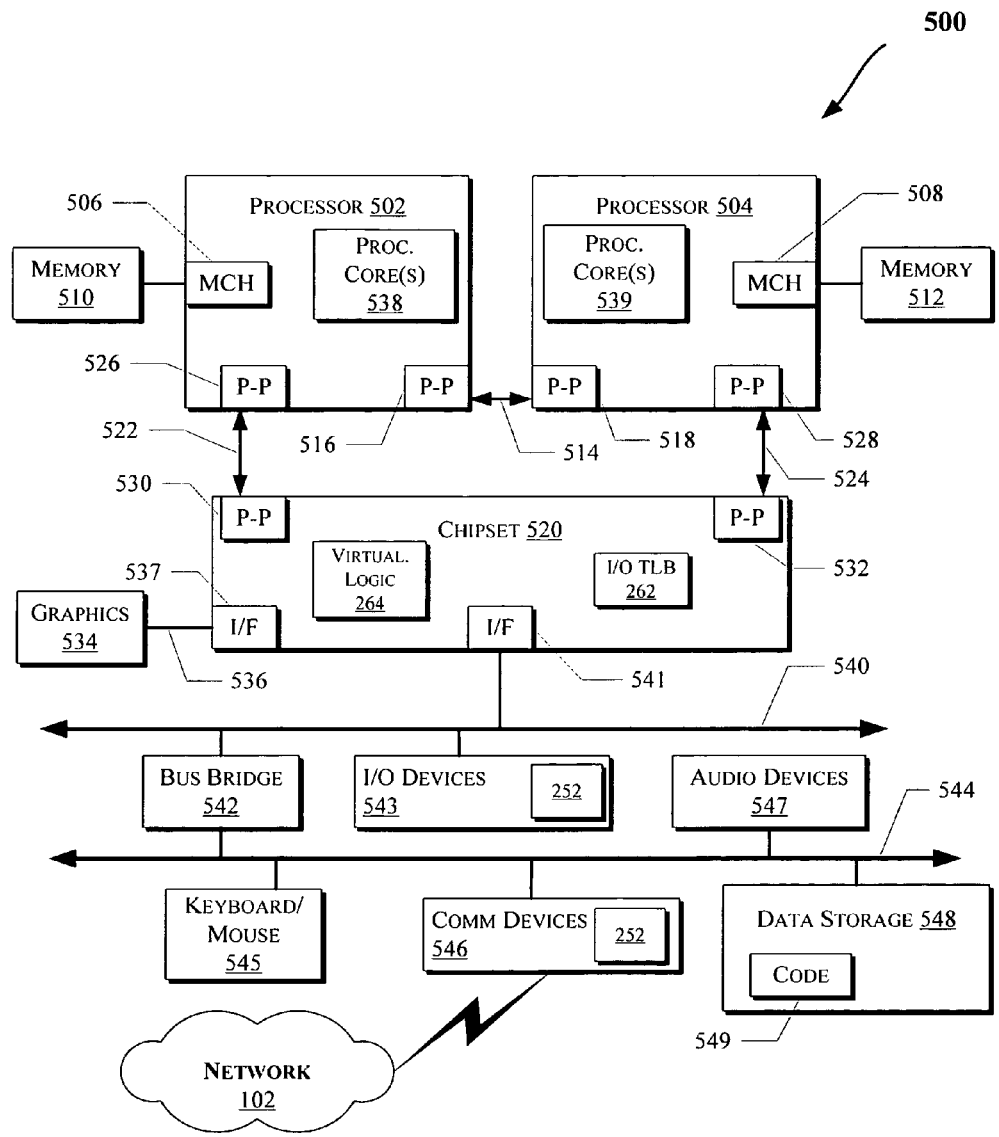

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. One or more of the devices 104-114 discussed with reference to FIG. 1 may include the system 500. Also, the operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to couple with memories 510 and 512. The memories 510 and/or 512 may store various data such as those discussed with reference to the memory 212 of FIG. 2. For example, each of the memories 510 and/or 512 may include one or more of the O/S 232, application 234, driver 236, buffers 238, and/or descriptors 240.

The processors 502 and 504 may be any type of processor such as those discussed with reference to the processors 202 of FIG. 2. The processors 502 and 504 may exchange data via a point-to-point (PtP) interface 514 using PtP interface circuits 516 and 518, respectively. The processors 502 and 504 may each exchange data with a chipset 520 via individual PtP interfaces 522 and 524 using point to point interface circuits 526, 528, 530, and 532. The chipset 520 may also exchange data with a high-performance graphics circuit 534 via a high-performance graphics interface 536, using a PtP interface circuit 537.

Each of the processors 502 and 504 may include one or more processor cores 538 and 539, respectively, such as the cores discussed with reference to FIG. 2. Some embodiments of the invention may exist in circuits, logic units, or devices within the system 500 of FIG. 5. For example, as illustrated in FIG. 5, the logic 264 and TLB 262 may be located within the chipset 520. Furthermore, other embodiments of the invention may be distributed throughout several circuits, logic units, or devices illustrated in FIG. 5.

The chipset 520 may be coupled to a bus 540 using a PtP interface circuit 541. The bus 540 may have one or more devices coupled to it, such as a bus bridge 542 and I/O devices 543. Via a bus 544, the bus bridge 542 may be coupled to other devices such as a keyboard/mouse 545, communication devices 546 (such as modems, network interface devices (such as the network adapter 230 o FIG. 2), etc.), an audio I/O device, and/or a data storage device 548. The data storage device 548 may store code 549 that may be executed by the processors 502 and/or 504. For example, the packet discussed with reference to FIG. 2 may be transmitted to or received from the network 102 by the system 500 through the communication devices 546. The packet may also be received through the I/O devices 543, or other devices coupled to the chipset 520. Furthermore, in some embodiments, one or more of the I/O devices 543, communication devices 546, and/or audio devices 547 may include the locking logic 308 and/or the lock releasing lock 312.

In various embodiments of the invention, the operations discussed herein, e.g., with reference to FIGS. 1-5, may be implemented by hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
    an input/output (I/O) translation look aside buffer to store a plurality of entries, each of the plurality of entries to comprise an I/O virtual address, a physical memory address, and a lock status field;
    a first logic to update a value stored in the lock status field of a first entry of the plurality of entries in response to a signal that indicates the first entry is to be locked, the signal to be generated in response to execution of one or more instructions and based on a type or usage model of data to be stored at a location identified by the physical memory address of the first entry.

2. The apparatus of claim 1, further comprising a processor to generate the signal based on execution of the one or more instructions.

3. The apparatus of claim 2, further comprising a memory to store the one or more instructions.

4. The apparatus of claim 3, wherein the memory stores one or more of: an application, an operating system, a device driver, or a virtual machine monitor module.

5. The apparatus of claim 2, wherein the one or more instructions analyze information associated with a memory access request to determine whether the signal is to be generated and wherein the one or more instructions correspond to one or more of: an application, an operating system, or a device driver.

6. The apparatus of claim 5, wherein the memory access request corresponds to one or more of a memory read access or a memory write access.

7. The apparatus of claim 1, further comprising a chipset that comprises one or more of the translation lookaside buffer or the first logic.

8. The apparatus of claim 1, wherein the lock status field comprises a single bit and the first logic sets or clears the single bit.

9. The apparatus of claim 1, further comprising a network adapter that comprises the first logic.

10. The apparatus of claim 1, further comprising a second logic to cause the first entry to be evicted after unlocked entries in the translation lookaside buffer are evicted.

11. The apparatus of claim 1, further comprising a second logic to cause the first entry to be flushed in response to one or more of:
    (a) execution of one or more instructions to explicitly flush one or more entries of the translation lookaside buffer, or
    (b) provision of additional storage in the translation lookaside buffer.

12. The apparatus of claim 1, wherein the data type is to comprise an isochronous data type.

13. The apparatus of claim 1, wherein the data usage model is to comprise a model where a same data buffer is repeatedly used for large data transfers.

14. A method comprising:
    generating a signal in response to execution of one or more instructions to indicate that an entry in an input/output (I/O) translation lookaside buffer is to be locked; and
    updating, in response to the signal, a value stored in a lock status field of the translation lookaside buffer that corresponds to the entry, wherein generating the signal is to be performed based on a type or usage model of data to be stored at a location corresponding to the entry.

15. The method of claim 14, further comprising analyzing information associated with a memory access request to determine whether the signal is to be generated, wherein the one or more instructions correspond to one or more of: an application, an operating system, or a device driver.

16. The method of claim 15, further comprising storing data corresponding to the memory access request in a memory.

17. The method of claim 15, further comprising accessing the translation lookaside buffer to translate an I/O virtual memory address corresponding to the memory access request into a physical memory address.

18. The method of claim 14, further comprising transmitting the signal to a chipset.

19. The method of claim 14, wherein the updating the value comprises setting or clearing one or more bits of the lock status field.

20. The method of claim 14, further comprising evicting a locked entry of the translation lookaside buffer after unlocked entries in the translation lookaside buffer are evicted.

21. A computer-readable storage medium comprising one or more instructions that when executed on a processor configure the processor to:
   determine whether an entry in a translation lookaside buffer is to be locked; and
   cause a first logic to update a value stored in a lock status field of the entry based on the determination that the entry is to be locked and based on a type or usage model of data to be stored at a location corresponding to the entry.

22. The computer-readable medium of claim 21, further comprising one or more instructions that configure the processor to analyze information associated with a memory access request to determine whether the entry is to be locked, wherein the one or more instructions to cause the first logic to update the value stored in the lock status field correspond to one or more of: an application, an operating system, or a device driver.

23. The computer-readable medium of claim 21, further comprising one or more instructions that configure the processor to cause the entry to be flushed in response to execution of one or more instructions to explicitly flush one or more entries of the translation lookaside buffer.

24. A computing system comprising:
   a display device;
   an input/output (I/O)) device coupled to the display device and configured to cause generation of a memory access request to access a location in a memory identified by an I/O virtual address;
   a cache to store an entry that comprises the I/O virtual address, a physical address corresponding to the I/O virtual address, and a lock status field; and
   a first logic coupled to the cache to update a value stored in the lock status field of the entry in response to a signal that indicates the entry is to be locked and based on a type or usage model of data to be stored at a location identified by the physical memory address of the entry.

25. The system of claim 24, wherein the display device comprises a flat panel display.

26. The system of claim 24, wherein the cache comprises a content addressable memory.

27. The system of claim 24, further comprising a processor to generate the signal based on execution of one or more instructions.

28. The system of claim 24, further comprising a second logic to cause the entry to be evicted after unlocked entries in the cache are evicted.

* * * * *